United States Patent [19]
Novits et al.

[11] Patent Number: 5,912,304
[45] Date of Patent: Jun. 15, 1999

[54] PROCESSES PROVIDING IMPROVED SCORCH RETARDATION DURING COMPOUNDING OF ELASTOMERS AND THERMOPLASTICS CURABLE WITH PEROXIDES AND AZO COMPOUNDS

[75] Inventors: Michael Fred Novits, Grand Island, N.Y.; Chester Joseph Kmiec, Phillipsberg, N.J.; Edward Phillip Hibbard, Elma, N.Y.

[73] Assignee: Elf Atochem North America, Inc., Philadephia, Pa.

[21] Appl. No.: 08/482,601

[22] Filed: Jun. 7, 1995

Related U.S. Application Data

[62] Division of application No. 08/228,821, Apr. 18, 1994, abandoned, which is a continuation of application No. 07/673,881, Mar. 22, 1991, abandoned.

[51] Int. Cl.$^6$ .......... C08F 259/08; C08F 263/04; C08F 255/06
[52] U.S. Cl. .......... 525/245; 525/260; 525/261
[58] Field of Search .......... 525/261, 260, 525/263, 265, 245

[56] References Cited

U.S. PATENT DOCUMENTS

| | | |
|---|---|---|
| 2,954,356 | 9/1960 | Merrifield . |
| 3,202,648 | 8/1965 | Latourette et al. . |
| 3,335,124 | 8/1967 | Larsen . |
| 3,382,221 | 5/1968 | Petropoulos .......... 526/261 |
| 3,522,225 | 7/1970 | Peri .......... 525/345 |
| 3,751,378 | 8/1973 | Cowperthwaite et al. . |
| 3,836,377 | 9/1974 | Delahunty .......... 526/220 |
| 3,888,830 | 6/1975 | Ogasawara . |
| 3,931,090 | 1/1976 | Amatangelo . |
| 3,954,907 | 5/1976 | Schober . |
| 4,048,259 | 9/1977 | Wegemund et al. .......... 260/881 |
| 4,174,341 | 11/1979 | Matoba . |
| 4,348,456 | 9/1982 | Imanaka .......... 526/261 |
| 4,406,826 | 9/1983 | Morgan .......... 526/261 |
| 4,632,950 | 12/1986 | Kmiec et al. .......... 524/202 |
| 4,925,898 | 5/1990 | Itokazu .......... 525/261 |
| 4,948,840 | 8/1990 | Berta . |
| 4,983,685 | 1/1991 | Aoshima .......... 525/343 |
| 5,245,084 | 9/1993 | Groepper .......... 568/558 |
| 5,292,791 | 3/1994 | Groepper .......... 524/530 |
| 5,292,815 | 3/1994 | Wreesmann .......... 525/261 |

FOREIGN PATENT DOCUMENTS

| | | |
|---|---|---|
| 0346863 | 6/1989 | European Pat. Off. . |
| 1535039 | 12/1978 | United Kingdom . |

*Primary Examiner*—Christopher Henderson
*Attorney, Agent, or Firm*—Stanley A. Marcus; Royal E. Bright

[57] ABSTRACT

A crosslinkable composition of a polymeric thermoplastic and/or elastomeric material which is susceptible to scorching when processed at elevated temperatures, prior to crosslinking, in the presence of a free radical initiator, is protected against such scorching by the incorporation therein of a mixture of at least one hydroquinone compound and a sulfur accelerator. This mixture may also contain at least one monomeric allylic, methacrylic, acrylic or diene type coagent. The mixture exhibits a synergistic effect resulting in improved scorch protection for peroxide cured systems when compared with the protection afforded by the components singly.

33 Claims, No Drawings

PROCESSES PROVIDING IMPROVED SCORCH RETARDATION DURING COMPOUNDING OF ELASTOMERS AND THERMOPLASTICS CURABLE WITH PEROXIDES AND AZO COMPOUNDS

This is a divisional of application Ser. No. 08/228,821 filed Apr. 18, 1994 now abandoned which is a continuation of application Ser. No. 07/673,881 filed Mar. 22, 1991 now abandoned.

BACKGROUND OF THE INVENTION

This invention relates to the prevention of scorching prior to crosslinking of a peroxide or azo compound crosslinkable thermoplastic and/or elastomeric composition.

A major difficulty in using organic peroxides or azo compounds in crosslinking (curing) elastomeric and thermoplastic materials applications is that they may initiate premature crosslinking (i.e. scorch) during compounding and/or processing prior to the actual phase in the overall process when curing is desired. With conventional methods of compounding, such as milling, Banbury, or extrusion, scorch occurs when the time-temperature relationship results in a condition where the peroxide or azo initiator undergoes thermal decomposition, initiating the crosslinking reaction whereby gel particles in the mass of the compounded polymer may be formed. The presence of these gel particles leads to inhomogeneity of the final product. Excessive scorch reduces the plastic properties of the material so that it can no longer be processed, resulting in the loss of the entire batch.

Therefore, it has been widely accepted that the peroxide of choice must have a high enough activation temperature so that compounding and/or other processing steps can be successfully completed prior to the final curing step. Thus one method of avoiding scorch is to use an initiator that is characterized by having a high 10 hour half-life temperature. The disadvantage to this approach is that one subsequently obtains a longer cure time, which results in lower throughput. High cure temperatures can be used but this runs into the disadvantage of higher energy costs.

A further way of avoiding scorch is to lower the compounding and/or processing temperature to improve the scorch safety margin of the crosslinking agent. This option however may be somewhat limited in scope depending upon the polymer and/or process involved. In addition, curing at the lower temperature requires longer cure times and results in lower throughput. Prior to the present invention, certain additives were incorporated into compositions which reduced the tendency for scorching. For example, British patent 1,535,039 discloses the use of organic hydroperoxides as scorch inhibitors for peroxide-cured ethylene polymer compositions. U.S. Pat. No. 3,751,378 discloses the use of N-nitroso diphenylamine or N,N'-dinitroso-paraphenylamine as retarders incorporated in a polyfunctional acrylate crosslinking monomer for providing long Mooney scorch times in various elastomer formulations. U.S. Pat. No. 3,202,648 discloses the use of nitrites such as isoamylnitrite, tert-decyl nitrite and others as scorch inhibitors for polyethylene. U.S. Pat. No. 3,954,907 discloses the use of monomeric vinyl compounds as protection against scorch. U.S. Pat. No. 3,335,124 describes the use of aromatic amines, phenolic compounds, mercaptothiazole compounds, bis(N,N-disubstituted thiocarbonyl)sulfides, hydroquinones and dialkyldithiocarbamate compounds. The use of mixtures of the active compounds in preventing scorch is neither taught nor suggested. U.S. Pat. No. 4,632,950 discloses the use of mixtures of two metal salts of disubstituted dithiocarbamic acid, wherein one metal salt is based on copper. This reference does not teach the use of such mixtures with neat peroxides. For some applications, it is desirable or mandatory to use liquid or neat peroxides, as described in this current invention. One such application is in extruded compounding. A common commercial process technique employs a liquid peroxide which is sprayed onto polymer pellets or granules to coat them prior to extrusion compounding. This can provide increased production efficiency and eliminates physical handling of hazardous compounds. This reference patent teaches that at least one filler must be present. The scorch resistant systems described in this reference are not effective in polyolefins specifically LDPE, LLDPE, or HDPE. The present invention is effective in polyolefin systems. Moreover, this reference does not teach the use of mixtures of hydroquinones and metal salts of disubstituted dithiocarbamic acid.

When employing these prior art methods for extending scorch time, the cure time and/or final crosslink density of the cured composition can be adversely affected, leading to a decrease in productivity and/or product performance. The present invention overcomes the disadvantages of the prior art in that an improvement in scorch at compounding temperatures is achieved without significant impact on the final cure time or crosslink density. This is achieved by incorporation of the cure retarding composition at low additive levels, thereby limiting the effect on properties. In addition, significant scorch protection is achieved, since the use of the combination of the hydroquinones and a sulfur accelerator of the dithiocarbamate or thiuram class results in a synergistic effect on scorch time at the low additive levels employed.

SUMMARY OF THE INVENTION

The present invention provides in a first composition aspect a scorch retarding composition comprising a hydroquinone and at least one sulfur accelerator.

The tangible embodiments of this composition aspect of the invention possess the inherent applied use characteristics of being scorch retarders showing greater effect than equivalent amounts of either component used separately when incorporated into polymeric compositions which are crosslinkable by free radical initiation while not substantially affecting final cure time or properties.

Special mention is made of compositions of the first composition aspect of the invention which additionally comprise a coagent.

The invention also provides in a second composition aspect a scorch retarding, curing/crosslinking composition comprising a free radical initiator selected from the group consisting of organic peroxides, azo compounds and mixtures thereof, and the scorch retarding composition of the first composition aspect of the invention.

The tangible embodiments of this second composition aspect of the invention possess the inherent applied use characteristics, when blended into conventional thermoplastic and/or elastomeric polymers as a crosslinking agent, of providing improved scorch protection for the blended system while not substantially affecting final cure times or characteristics.

This invention also provides in a third composition aspect a crosslinkable composition comprising a peroxide or azo compound crosslinkable thermoplastic and/or elastomeric polymer, and a scorch retarding curing/crosslinking composition as defined in the second composition aspect of the inventions.

The invention also provides in an improved process for the preparation of a crosslinkable composition comprising a peroxide or azo compound crosslinkable thermoplastic and/or elastomeric polymer and a free radical initiator selected from the group of organic peroxides, azo compounds and mixtures thereof wherein said polymer is compounded with said free radical initiator, the improvement comprising performing said compounding in the presence of a scorch retarding composition of the first composition aspect of the invention.

Special mention is made of processes of this process aspect of the invention wherein the scorch retarding composition additionally comprises a coagent.

In the practice of this invention, the preferred blends of hydroquinones and sulfur accelerators exhibit acceptable solubility in the free radical initiators when the selected free radical initiator is a liquid or low melting solid. Thus, this new technology will allow for a pumpable or a meterable homogeneous crosslinking system that provides ease of handling and greater worker safety as well as longer compounding times for better mixing due to the improved scorch protection provided.

Where homogenous liquid or low melting solid crosslinking compositions are not normally used such as in rubber compounding, and the selected scorch retarding crosslinking composition is liquid, the hydroquinone, peroxide, sulfur accelerator and optional coagent(s) either as individual portions, or the entire combined scorch retarding crosslinking composition may be dispersed on an inert filler (preferably an inorganic filler) for ease of addition during compounding such as on a rubber mill. A masterbatch on a polymeric binder may be used in the same fashion for the same purpose.

DETAILED DESCRIPTION

The superior scorch resistance for peroxide and azo crosslinkable elastomeric and/or thermoplastic polymeric systems may be obtained by admixing, conveniently by employing conventional compounding means, with the thermoplastic and/or elastomeric polymer which is desired to be crosslinked, a scorch retarding crosslinking composition comprising a free radical initiator selected from the group consisting of organic peroxides, azo compounds and mixtures thereof, a hydroquinone compound, at least one sulfur accelerator, and optionally any of the known acrylic, methacrylic or allylic monomers.

The scorch retarding curing/crosslinking composition may preferably be blended into the desired polymer as a preformed mixture or the individual ingredients thereof may be incorporated into the polymer separately or even as subcombinations of one or more but not all the ingredients. If incorporation as individual or subcombinations of ingredients is desired, it is preferred that the hydroquinone, monomers, and/or the sulfur accelerator be blended into the polymer prior to blending of the free radical initiator.

Free Radical Initiators

In accordance with the present invention, compounds well known in the art such as azo initiators and/or organic peroxides (with the exception of hydroperoxides and peroxydicarbonates) which upon thermal decomposition generate free radicals that facilitate the curing/crosslinking reaction may be employed. Of the free radical initiators used as crosslinking agents, the dialkyl peroxides and diperoxyketal initiators are preferred. A detailed description of these compounds may be found in the Encyclopedia of Chemical Technology, 3rd edition, Vol. 17, pp 27–90. (1982)

In the group of dialkyl peroxides, the preferred initiators are:
dicumyl peroxide
di-t-butyl peroxide
t-butyl cumyl peroxide
2,5-dimethyl-2,5-di(t-butylperoxy)-hexane
2,5-dimethyl-2,5-di(t-amylperoxy)-hexane
2,5-dimethyl-2,5-di(t-butylperoxy)hexyne-3
2,5-dimethyl-2,5-di(t-amylperoxy)hexyne-3
alpha,alpha-di[(t-butylperoxy)-isopropyl]-benzene
di-t-amyl peroxide
1,3,5-tri-[(t-butylperoxy)-isopropyl]benzene
1,3-dimethyl-3-(t-butylperoxy)butanol
1,3-dimethyl-3-(t-amylperoxy) butanol
and mixtures thereof.

In the group of diperoxyketal initiators, the preferred initiators are:
1,1-di(t-butylperoxy)-3,3,5-trimethylcyclohexane
1,1-di(t-butylperoxy)cyclohexane
n-butyl 4,4-di(t-amylperoxy)valerate
ethyl 3,3-di(t-butylperoxy)butyrate
2,2-di(t-amylperoxy)propane
3,6,6,9,9-pentamethyl-3-ethoxycarbonylmethyl-1,2,4,5-tetraoxacyclononane;
n-butyl-4,4-bis(t-butylperoxy)-valerate;
ethyl-3,3-di(t-amylperoxy)-butyrate
and mixtures thereof.

Other peroxide, e.g., 00-t-butyl-0-hydrogen monoperoxysuccinate; 00-t-amyl-0-hydrogen-monoperoxysuccinate and/or azo initiators e.g., 2,2'-azobis-(2-acetoxypropane) may also be used to provide a crosslinked polymer matrix. Mixtures of two or more free radical initiators may also be used together as the initiator within the scope of this invention.

Other suitable azo compounds include those described in U.S. Pat. Nos. 3,862,107 and 4,129,531 which are incorporated herein by reference.

The amount of the scorch retarding crosslinking composition aspect of this invention to be incorporated in a crosslinkable composition will readily be selected by one of skill in the art to be sufficient to afford the desired degree of crosslinking. When the free radical initiator component is an organic peroxide, the scorch retarding crosslinking composition may be employed in quantities to provide a concentration of peroxide in the crosslinkable composition ranging from 0.01 to 30 parts by weight, preferably, from 0.01 to 20 parts by weight, most preferably from 0.5 to 4.0 parts by weight for each 100 parts by weight of polymer.

Sulfur Accelerators

Any of the known sulfur accelerators as understood by one of skill in the art to be employed in curing of elastomers are contemplated for use in the practice of the invention. One sulfur accelerator class that is suitable for use in the practice of this invention comprises metal salts of disubstituted dithiocarbamates. The metal salts of disubstituted dithiocarbamic acid, which are suitable in the practice of this invention may be represented by the structure:

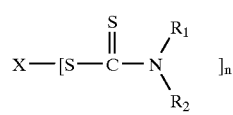

wherein X is an ion derived from a metal selected from the group consisting of nickel, cobalt, iron, chromium, tin, zinc, copper, lead, bismuth, cadmium, selenium, and tellurium, n may vary from 1 to 6 and is equal to the formal valence of the metal, $R_1$ and $R_2$ are independently alkyl of 1 to 7 carbon atoms.

Examples of the metal salts of disubstituted dithiocarbamic acid are:
bismuth dimethyldithiocarbamate
cadmium diamyldithiocarbamate
cadmium diethyldithiocarbamate
copper dimethyldithiocarbamate
lead diamyldithiocarbamate
lead dimethyldithiocarbamate
selenium dimethyldithiocarbamate
tellurium diethyldithiocarbamate
zinc diamyldithiocarbamate
zinc diethyldithiocarbamate
zinc dimethyldithiocarbamate
selenium dimethyldithiocarbamate A second sulfur accelerator class that is also suitable for use in the practice of this invention comprises the thiurams. Thiuram accelerators are prepared from secondary amines and carbon disulfide. They may be represented by the following structure:

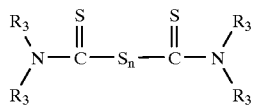

wherein $R_3$ is an alkyl group of 1 to 7 carbon atoms and n may have a positive value from greater than zero up to 6. Examples of thiuram type accelerators include:
tetrabutylthiuram disulfide
tetraethylthiuram disulfide
tetramethylthiuram disulfide
tetramethylthiuram monosulfide These classes of sulfur accelerators as well as other suitable classes of sulfur accelerators such as the sulfenamides, thiazoles, thioureas and xanthates are described in further detail in The Vanderbilt Rubber Handbook, pp 339–380. The sulfur accelerators described therein encompass the classes of sulfur compounds which would be comprehended by one of skill in the art of curing elastomeric polymers as sulfur accelerators. Simple mercaptans of the formula RSH are not included in this class of sulfur accelerators.

Hydroquinones

The hydroquinones which are suitable in the practice of this invention are described in detail in the Encyclopedia of Chemical Technology, Third Edition, vol. 19 pp 572–606. Examples of hydroquinones particularly useful in the practice of this invention are:
hydroquinone
hydroquinone di(beta-hydroxyethyl)ether
hydroquinone monomethyl ether
mono-tert-butyl hydroquinone
di-t-butyl hydroquinone
di-t-amyl hydroquinone The sulfur accelerator and the hydroquinone are employed in amounts that are sufficient to achieve the desired balance in cure characteristics. The weight ratio of hydroquinone compound to sulfur accelerator is from 1:50 to 500:1 preferably from 1:25 to 250:1 more preferably from 1:25 to 25:1, still more preferably from 1:10 to 10:1 and most preferably from 1:1 to 5:1. The weight ratio of this blend to peroxide can range from 0.5:100 to 1:2, preferably from 1:100 to 1:2, more preferably from 1:100 to 1:4 and still more preferably from 1:25 to 1:20.

Coagents

Various vinyl and/or allyl monomers are used to enhance crosslinking and as such are often called crosslinking coagents. The effective coagents are generally difunctional or polyfunctional vinyl and/or allyl monomers.

The use of these monomers or crosslinking coagents in the practice of this invention provides a number of advantages:
1) The extent of crosslinking as measured by $M_H$, the maximum torque shown by an oscillating disc rheometer is enhanced or maintained in the final cured polymer when scorch retarding compared with formulations not employing coagents.
2) The solubility and ease of preparation of solutions of the peroxide, quinone and sulfur accelerator are surprisingly facilitated;
3) An important and unexpected enhanced phase and color stability is provided in scorch retarding curing/crosslinking peroxide solution formulations contemplated by the second composition of the invention.
4) It has surprisingly been found, for those compositions tested, when ingredients are combined in the proper order, the speed and ease of dissolution and thus the preparation of the second composition aspect compositions of the invention are made more rapid and easier. This order is first coagent, second hydroquinone, third sulfur accelerator, last peroxide or azo compound.

Blends of coagents may also be used in the practice of this invention wherein monofunctional monomers may be used in combination with the di- or poly-vinyl and/or allyl monomers.

Representative monomers include but are not limited to the following: methyl methacrylate, lauryl methacrylate, allyl methacrylate, trimethylol propane triacrylate, triallyl cyanurate, triallyl isocynaurate, triallyl phosphate, tetraallyloxyethane, allyldiglycol, carbonate, triallyltrimellitate, triallylcitrate, diallyl adipate, diallylterephthalate, diallyl oxalate, diallyl fumarate, ethylene glycol dimethacrylate, 2-hydroxyethyl methacrylate.

Other polyfunctional vinylic compounds such as liquid 1,2-polybutadiene may also be used.

Particular preferred monomers are selected from: allyl methacrylate, triallylcyanurate, triallyltrimellitate, triallylisocyanurate, allydiglycolcarbonate, diallyl oxalate, methyl methacrylate and blends thereof.

The monomeric compounds, when incorporated into any of the composition aspects of the invention, may be used in ratios of 100:1 to 1:100 preferably 50:1 to 1:50, most preferably 10:1 to 1:10 with respect to the combined amount of sulfur accelerators and quinones present.

Polymers

The thermoplastic and/or elastomeric polymers encompassed in the present invention may be defined as those natural or synthetic polymers which are thermoplastic and/or elastomeric in nature, and which can be crosslinked (cured) through the action of a crosslinking agent. Rubber World, "Elastomer Crosslinking with Diperoxyketals," October, 1983, pp.26–32, and Rubber and Plastic News, "Organic Peroxides for Rubber Crosslinking," Sep. 29, 1980, pp. 46–50, describe the crosslinking action and crosslinkable polymers. Polyolefins suitable for use in this invention are described in Modern Plastics Encyclopedia 89 pp 63–67, 74–75. Illustrative polymers include linear low density polyethylene, low density polyethylene high density polyethylene, chlorinated polyethylene, ethylene-propylene terpolymers, ethylene vinyl acetate, ethylene-propylene copolymers, silicone rubber, chlorosulfonated polyethylene, fluoroelastomers.

In addition, blends of two or more polymers may be employed. The polymers described above and the crosslinkable compositions prepared therefrom may contain various other additives known to those skilled in the art including fillers such as carbon black, titanium dioxide, and the alkaline earth metal carbonates. Monomeric co-agents such as triallylcyanurate, allyldiglycolcarbonate, triallylisocyanurate, trimethylolpropane diallylether, trimethylolpropane trimethacrylate, various allylic compounds, methacrylates and acrylate compounds may also be added separately to the various polymers above. It is also well known in the art that polymer containing compositions in general may also contain antioxidants, stabilizers, plasticizers, and processing oils. The crosslinkable compositions of this invention may also contain such conventional additives.

The novel compositions can be incorporated into a masterbatch or carrier comprising various polyolefins and/or elastomers at levels from about 5 to 80 percent by weight.

For ease of addition for certain processes, the scorch retarding crosslinking composition, in the form of a homogenous liquid or meltable solid, may be dispersed on an inert filler such as $CaCO_3$, silica or clay at levels from about 10 to 80 percent by weight.

The scorch retarding crosslinking composition can be incorporated into a polymeric thermoplastic and/or elastomeric material, as a preformed mixture or with the addition of each component separately, resulting in improved scorch protection. The weight ratio of hydroquinone compound to sulfur accelerator in the first composition aspect of the invention may be from 1:50 to 500:1, preferably from 1:25 to 250:1, more preferably from 1:25 to 25:1, still more preferably from 1:10 to 10:1, and most preferably from 1:1 to 5:1. The weight ratio of the first composition aspect to peroxide in the second composition aspect of the invention may range from 0.5:100 to 1:2, preferably from 1:100 to 1:2, more preferably 1:100 to 1:4, and still more preferably 1:25 to 1:20. The peroxide, quinone, sulfur accelerator and optional coagent containing second composition aspect of the invention may be incorporated into the polymeric thermoplastic and/or elastomeric material in quantities to provide a peroxide concentration in the crosslinkable composition ranging from 0.01 to 30 parts by weight, preferably from 0.01 to 20 parts by weight, most preferably from 0.5 to 4.0 parts by weight for each 100 parts by weight of polymer.

The crosslinkable composition may be heat cured to a time sufficient to obtain the desired degree of crosslinking. The heat curing has a temperature-time relationship which is primarily dependent on the polymeric compound and the peroxide initiator present, but that relationship may be affected by other ingredients in the formulation. It is customary to use a time equal to about 6 to 8 half-lives of the initiator, but this may be varied based on experience at the option of the operator depending on the exact properties desired in the final product. The inclusion of the scorch retarding compositions of this invention has no substantial effect on the time-temperature relationship when compared to the relationship in a similar system without the scorch retarding composition.

Crosslinking (curing) may be carried out at a temperature of 100°–300° C. or more. The cure time is inversely related to the temperature. Systems employing the preferred initiators heat cure at temperature-time relations of about 120°–200° C. and 0.5 to 30 minutes. The heat curing may be carried out in any conventional fashion such as mold cures, oil bath cures (where oil does not harm the polymeric compound), oven cures, steam cures, or hot metal salt bath cures.

General Experimental Procedures

All formulations were compounded utilizing the C. W. Brabender Plastigraph with type-5 mixing blades. Mixer temperatures are specified below for various resin types.

| Resin Type | Temp (° C.) |
|---|---|
| high density polyethylene (HDPE) | 140 |
| low density polyethylene (LDPE) | 110 |
| linear low density PE (LLDPE) | 125 |
| ethylene-vinyl acetate (EVA) | 105 or less |
| ethylene-propylene-diene (EPDM) monomers terpolymer | ambient temperature |
| fluoroelastomer | ambient temperature |

To prepare crosslinkable compositions, except for the polymer, all components of the composition, for example, the peroxide, a disubstituted dithiocarbamic acid, and hydroquinone were weighed at the desired parts by weight resin into a ten dram vial and mixed to form a homogeneous solution. The quantity of each ingredient expressed in parts per 100 parts of polymer is listed in each example.

For both thermoplastic and rubber (elastomeric) compositions, 100 parts by weight of polymer were fluxed in the mixer using a mixing speed of 30 rpm at a mixing temperature designated in the specific examples. The preweighed component mixture in the vial was then slowly added to the fluxing resin. The composition was then allowed to mix for six (6) minutes, after which the composition was removed and subsequently pressed into a flat plaque (of no specific thickness), using a Carver laboratory press (Model C) set at the polymer melting point, folded and pressed at least six times to remove air bubbles and smooth out sample, and then the plaque was allowed to cool to room temperature.

Testing

Crosslinking evaluations were carried out on the prepared compositions using a Monsanto Oscillating Disk Rheometer (Model R-100).

The Monsanto Rheometer test procedure consists of an uncured sample enclosed, under positive pressure, in a heated die cavity containing a biconical disk. The disk is oscillated (100 cycles/min) through an arc of 1° or 3° or 5°. The force, or torque, required to oscillate the disk is recorded as a function of time. This shear modulus is proportional to the extent of crosslinking, and is a representation of the cure reaction. The shear modulus increases as percent crosslinking increases. The test variables recorded from the rheometer were:

$M_H$—Maximum torque (in-lbs), a measure of crosslinking attained.

$M_L$—Minimum torque (in-lbs), a measure of viscosity of the compound and an indicator of scorch. Increased $M_L$ values are indicative of scorch.

$M_H$-$M_L$—Difference between maximum and minimum torque values. This is useful in determining extent of crosslinking.

$T_{C90}$—Cure Time (minutes), time to reach 90% of maximum torque as defined by $(M_H-M_L)$ 0.9+$M_L$.

$T_{S2}$—Scorch time (minutes), time required for torque to increase two inch-pounds above $M_L$ $T_V$—Vulcanization time, calculated by $T_{C90}-T_{S2}$, a measure of cure rate, in which the curing rate is isolated from the scorch or processing phase.

$_\Delta T_{S2}$—Delta $TS_2$ (minutes), the difference in scorch time calculated by the $T_{S2}$ of a scorch retarded peroxide containing polymer formulation minus the $T_{S2}$ for a comparable reference or control peroxide containing polymer formulation. The cure is adjusted so that $(M_H)$ is virtually identical for both formulations.

Other reported "Delta" (Δ) values have been determined in similar fashion from the differences determined for the particular variable.

Torque values reported $(M_H-M_L)$ are rounded off to the nearest whole number. Scorch time values are rounded off to the nearest tenth of a minute.

The following examples are provided to illustrate preferred embodiments of the invention, and are not intended to restrict the scope thereof.

EXAMPLE 1

This example illustrates the desirable increase in scorch time change, delta $T_{S2}$, when using a synergistic blend of a hydroquinone such as hydroquinone monomethyl ether (HQMME) and a dithiocarbamate such as zinc diamyldithiocarbamate (ZnDADTC) as a scorch retarding composition as compared to the use of these additives separately in a dicumyl peroxide cure of a LLDPE (Union Carbide DFDA7530). Six scorch retarding crosslinking compositions were evaluated (A–F)

| Components | A | B | C | D | E | F |
|---|---|---|---|---|---|---|
| | (Quantities in parts by weight) | | | | | |
| Dicumyl Peroxide (100% assay) | 100 | 100 | 100 | 100 | 100 | 100 |
| HQMME | 0 | 6.0 | 9.0 | 0 | 0 | 6.0 |
| ZnDADTC (pure basis) | 0 | 0 | 0 | 3.0 | 9.0 | 3.0 |

In order to accurately compare change in scorch time, delta $T_{S2}$, for each peroxide composition on the curing of LLDPE, the parts per hundred rubber (phr) use level of each blend (A–F) was adjusted to provide the same magnitude of cure $(M_H)$ for the LLDPE containing crosslinkable compositions (G–L) below.

LLDPE COMPOSITIONS $M_H$=60 in-lbs. for all samples (Monsanto ODR R-100 at 360° F., ±3° arc).

| parts of (A–F) peroxide compositions per 100 parts of LLDPE (by weight) | G | H | I | J | K | L |
|---|---|---|---|---|---|---|
| | 1.5A | 1.94B | 2.24C | 1.72D | 2.03E | 2.19F |

The use levels of HQMME and/or ZnDADTC present in each composition are provided below, along with the resulting changes in scorch time, delta $T_{S2}$, obtained at the equivalent degree of cure for the samples shown above.

| Components | G | H | I | J | K | L |
|---|---|---|---|---|---|---|
| | (parts by weight) | | | | | |
| Dicumyl peroxide (100% assay) | 1.5 | 1.83 | 2.05 | 1.62 | 1.72 | 1.95 |
| HQMME | 0 | 0.12 | 0.18 | 0 | 0 | 0.12 |
| ZnDADTC (pure basis) | 0 | 0 | 0 | 0.06 | 0.18 | 0.06 |
| LLDPE | 100 | 100 | 100 | 100 | 100 | 100 |
| $T_{S2}$ (min) | 5.9 | 8.0 | 9.3 | 6.1 | 8.5 | 10.1 |
| $\Delta T_{S2}$ (min) | — | +2.1 | +3.4 | +0.2 | +2.6 | +4.2 |

Monsanto ODR at 290° F., ± 3° arc

The equal weight usage of HQMME and ZnDADTC singly in compositions H and J provides a +2.1 and +0.2 improvement in scorch time respectively for a total change in scorch time $(\Delta T_{S2})$ of only +2.3 min. as compared to +4.2 min. improvement in scorch time for the synergistic combination in composition L.

Using significantly higher concentrations of either additive, as in compositions I or K does not provide the scorch time improvement attained by the novel additive blend in composition L.

EXAMPLE 2

This example illustrates the desirable increase in scorch time change, delta $T_{S2}$, when using a blend of a hydroquinone such as mono-t-butylhydroquinone (MTBHQ) and a thiuram such as tetrabutylthiuram disulfide (TBTD) as compared to the singular use of these additives in a dicumyl peroxide cure of EVA (U.S.I. EY901). Six peroxide compositions were evaluated (A–F).

| Components | A | B | C | D | E | F |
|---|---|---|---|---|---|---|
| | (Quantities in parts by weight) | | | | | |
| Dicumyl Peroxide (100% Assay) | 100 | 100 | 100 | 100 | 100 | 100 |
| MTBHQ | 0 | 2.0 | 0 | 0 | 2.0 | 2.0 |
| TBTD | 0 | 0 | 2.0 | 4.0 | 2.0 | 4.0 |

In order to accurately compare change in scorch time delta $T_{S2}$ for each peroxide composition on the curing of EVA, the phr use level of each blend (A–F) was adjusted to provide the same magnitude of cure $(M_H)$ for the EVA compositions (G–L) below.

EVA COMPOSITIONS

| parts of (A–F) peroxide compositions per 100 parts of EVA | G | H | I | J | K | L |
|---|---|---|---|---|---|---|
| | 1.49A | 1.60B | 1.50C | 1.55D | 1.60E | 1.70F |

$M_H$ = 45 in.-lb. for all samples
Monsanto ODR at 360° F., ±3° arc

The use levels of MTBHQ and/or TBTD present in each composition are provided below, along with the resulting change in scorch time, delta $T_{S2}$, obtained at equivalent degree of cure as indicated above.

| Components | G | H | I | J | K | L |
|---|---|---|---|---|---|---|
| | (parts by weight) | | | | | |
| Dicumyl peroxide (100% Assay) | 1.49 | 1.57 | 1.47 | 1.52 | 1.54 | 1.61 |
| MTBHQ | 0 | 0.03 | 0 | 0 | 0.03 | 0.03 |
| TBTD | 0 | 0 | 0.03 | 0.06 | 0.03 | 0.06 |
| EVA | 100 | 100 | 100 | 100 | 100 | 100 |
| $T_{S2}$ (min) | 4.4 | 6.0 | 7.0 | 8.4 | 9.4 | 10.8 |

-continued

| Components | G | H | I | J | K | L |
|---|---|---|---|---|---|---|
| | | | (parts by weight) | | | |
| $\Delta T_{S2}$ (min) | — | +1.6 | +2.6 | +4.0 | +5.0 | +6.4 |
| Monsanto ODR at 290° F., = 3° arc | | | | | | |

The equal weight usage of MTBHQ and TBTD singly in compositions H and I provide a +1.6 and +2.6 min. improvement in scorch time for a total of +4.2 min. as compared to +5.0 min. for the synergistic blend of these two additives in composition K. The use of MTBHQ and TBTD singly in compositions H and J provide a corresponding +1.6 and +4.0 min. improvement in scorch time for a total of 5.6 min., as compared to 6.4 min. for the synergistic blend of these two additives in composition L.

EXAMPLE 3

This example illustrates the desirable increase in scorch time change, delta $T_{S2}$, when using a synergistic blend of a hydroquinone such as mono-t-butylhydroquinone (MTBHQ) and a thiuram such as tetrabutylthiuram disulfide (TBTD) as compared to the singular use of these additives in a 2,5-Dimethyl-2,5-di(t-butylperoxy) hexane cure of EVA (U.S.I EY901). Five peroxide compositions were evaluated (A–E).

| Components | A | B | C | D | E |
|---|---|---|---|---|---|
| | (Quantities in parts by weight) | | | | |
| 2,5-Dimethyl-2,5-di (t-butylperoxy)hexane | 100 | 100 | 100 | 100 | 100 |
| MTBHQ | 0 | 2.0 | 0 | 0 | 2.0 |
| TBTD | 0 | 0 | 2.0 | 4.0 | 2.0 |

In order to accurately compare change in scorch time, delta $T_{S2}$ for each peroxide composition on the curing of EVA, the phr use level of each blend (A–E) was adjusted to provide the same magnitude of cure ($M_H$) for the EVA compositions (F–J) below.

| | EVA COMPOSITIONS | | | | |
|---|---|---|---|---|---|
| parts of (A–E) | F | G | H | I | J |
| peroxide compositions per 100 parts of EVA | 1.24A | 1.30B | 1.29C | 1.36D | 1.35E |
| $M_H$ = 50 in.-lb. for all samples | | | | | |
| Monsanto ODR at 360° F., ± 3° arc | | | | | |

The use levels of MTBHQ and/or TBTD present in each composition is provided below, along with the resulting change in scorch time, delta $T_{S2}$, obtained at equivalent degree of cure as indicated above.

| Components | F | G | H | I | J |
|---|---|---|---|---|---|
| | (Quantities in parts by weight) | | | | |
| 2,5-Dimethyl-2,5-di (t-butylperoxy)hexane | 1.24 | 1.27 | 1.26 | 1.30 | 1.29 |
| MTBHQ | 0 | 0.03 | 0 | 0 | 0.03 |
| TBTD | 0 | 0 | 0.03 | 0.06 | 0.03 |
| EVA | 100 | 100 | 100 | 100 | 100 |
| $T_{S2}$ (min) | 4.9 | 7.9 | 7.5 | 9.3 | 11.8 |
| $\Delta T_{S2}$ (min) | — | +3.0 | +2.6 | +4.4 | +6.9 |
| Monsanto ODR at 290° F., ±3° arc | | | | | |

The equal weight usage of MTBHQ and TBTD singly in compositions G and H provide a +3.0 and +2.6 min. improvement in scorch time for a total of +5.6 min. as compared to +6.9 min. for the synergistic blend of these two additives in composition J.

EXAMPLE 4

This example illustrates the desirable increase in scorch time change, delta $T_{S2}$, when using a synergistic blend of a hydroquinone such as hydroquinone monomethyl ether and a dithiocarbamate such as zinc diamyldithiocarbamate (ZnDADTC) as compared to the use of these additives singly in a 1,1-bis-(t-butylperoxy)-3,3,5-trimethyl-cyclohexane cure of Nordel 1040 EPDM.

In order to accurately compare change in scorch time, delta $T_{S2}$, for each composition on the curing of EPDM, the phr use level of the peroxide was adjusted to provide the same magnitude of cure ($M_H$) for the EPDM compositions listed below. The additives included in the systems were kept at constant levels.

| | EPDM COMPOSITIONS | | | | |
|---|---|---|---|---|---|
| Ingredient | A | B | C | D | E |
| | (Quantity in parts by weight) | | | | |
| Nordel 1040 (DuPont) | 100 | 100 | 100 | 100 | 100 |
| N660 Black | 25 | 25 | 25 | 25 | 25 |
| 1,1-bis-(t-butylperoxy)- 3,3,5-trimethyl-cyclo- hexane | 2.2 | 2.7 | 2.3 | 2.5 | 2.7 |
| HQMME | 0 | .063 | 0 | 0 | .063 |
| ZnDADTC (pure basis) | 0 | 0 | .032 | .095 | .032 |
| $T_{C90}$ (min) | 9.5 | 9.5 | 9.5 | 9.5 | 9.5 |
| $M_H$ (in-lb) | 63 | 63 | 63 | 63 | 63 |
| Monsanto ODR at 300° F., ±3° arc | | | | | |
| $T_{S2}$ (min) | 6.3 | 9.6 | 6.4 | 7.7 | 11.3 |
| $\Delta T_{S2}$ (min) | — | +3.3 | +0.1 | +1.4 | +5.0 |
| Monsanto ODR at 250° F., ±3° arc | | | | | |

The sum of the delta $T_{S2}$ singular contributions from the HQMME and ZnDADTC is +3.4 min (B and C). Unexpectedly, combination E added 5.0 minutes of scorch time protection to the control (A). The same amount of ZnDADTC (D) added only 1.4 minutes. At levels such as (D) HQMME is not soluble in the peroxide.

Therefore, E shows a synergistic effect with a significant increase in scorch time of 79% at 250° F. which can not be obtained by use of HQMME or ZnDADTC used alone.

EXAMPLE 5

This example illustrates the increase in scorch time protection with hydroquinone-monomethyl ether (HQMME) and Zinc dibutyl dithiocarbamate (ZnDBDTC), which are solids, dissolved in a blend of peroxides, dicumyl peroxide and 1,1-di[(t-butylperoxy)-isopropyl]benzene (DTBPIPB) in the curing of EVA (UE637).

| Components | A | B | C | D |
|---|---|---|---|---|
| | (Quantities in parts by weight) | | | |
| Dicumyl peroxide | 60 | 60 | 60 | 60 |
| 1,1-di[(t-butylperoxy)-isopropyl]benzene | 40 | 40 | 40 | 40 |
| Zn DBDTC | 0 | 2.5 | 0 | 2.5 |
| HQMME | 0 | 0 | 5.0 | 5.0 |

Final use levels and change in scorch time are shown below. Monsanto ODR at 290° F., ±3° arc.

| | EVA Compositions | | | |
|---|---|---|---|---|
| | E | F | G | H |
| Ingredients | (Quantities in parts by weight) | | | |
| UE637 | 100 | 100 | 100 | 100 |
| ZnO | 4.0 | 4.0 | 4.0 | 4.0 |
| antioxidant* | 0.5 | 0.5 | 0.5 | 0.5 |
| Component | | | | |
| A | 2.0 | .20 | .25 | .35 |
| B | 0 | 2.05 | 0 | 0 |
| C | 0 | 0 | 2.10 | 0 |
| D | 0 | 0 | 0 | 2.15 |

Monsanto ODR results at 360° F., ±3° show all cures to be equal. $M_H$ was 51 in.lb. and $T_{C90}$ was 8.0 min.

*polymerized 1,2-dihydro-2,2,4-trimethylquinoline (R. T. Vanderbilt)

| | E | F | G | H |
|---|---|---|---|---|
| Ingredient | (Quantity in parts by weight) | | | |
| dicumyl peroxide | 1.2 | 1.32 | 1.35 | 1.41 |
| a,a-di[(t-butylperoxy)-isopropyl]benzene | .8 | .88 | .90 | .94 |
| ZnDBDTC | 0 | .05 | 0 | .05 |
| HQMME | 0 | 0 | .10 | .10 |
| $T_{S2}$ (min.) | 9.0 | 9.8 | 16.0 | 17.7 |
| $\Delta T_{S2}$ | — | +.8 | +7.0 | +8.7 |

ZnDBDTC and HQMME used individually improve $T_{S2}$ by 0.8 min. and 7.0 min. for a total of 7.8 min. The actual blend in composition (H) adds 8.7 min. to the original scorch time with no retarder additive (E).

The usefulness of this system in a peroxide blend can be seen in this Table with all samples cured the same, (51 in.lb.) and arranged according to cure time, and half life.

| | Dicumyl Peroxide | Comp. E | Comp. H | DTBPIPB |
|---|---|---|---|---|
| $T_{C90}$ @ 360° F. (min.) | 6.2 | 8.0 | 8.0 | 10.2 |
| $T_{S2}$ @ 290° F. (min.) | 7.1 | 9.0 | 17.7 | 13.2 |

A common practice to increase scorch time is to blend or totally substitute a peroxide with a higher half life, for example the use of DTBPIPB to replace dicumyl peroxide. A disadvantage to this practice is that a significant improvement in scorch time is obtained at the expense of decreased productivity, e.g. longer cure times. A blend of these two peroxides (composition E) provides intermediate cure and scorch times. In the practice of this invention (composition H) one unexpectedly obtains a significantly longer scorch time not obtainable with the higher half life initiator DTBPIPB when used alone, without the disadvantage of a longer cure time.

EXAMPLE 6

This example illustrates that the hydroquinone compound and sulfur accelerator may be incorporated into a masterbatch to be added to the polymer to be crosslinked, separate from the peroxide. An EVA (UE634 U.S.I.) was used as the carrier for the scorch retarders which are used with and without a monomeric cocuring agent. Free flowing pellets are the final form.

| | Masterbatch components (Quantities in parts by weight) | |
|---|---|---|
| | A | B |
| EVA | 100 | 100 |
| HQMME | 4 | 2 |
| ZnDADTC (50%) | 4 | 2 |
| TAIC* | 0 | 6 |

*triallylisocyanurate

Dicumyl peroxide, with these masterbatches, was used to crosslink the same EVA used at equal weights to peroxide solutions containing scorch retarders used to prepare compositions (D) and (F). Thus the final EVA formulations (E) and (G) prepared using the above (A), and (B) masterbatches are equivalent in composition to (D) and (F) respectively.

| | (Quantities in parts by weight) | | | | | |
|---|---|---|---|---|---|---|
| | C | D | E | F | G | H |
| EVA | 100 | 100 | 97.5 | 100 | 95.0 | 100 |
| Batch A | 0 | 0 | 2.7 | 0 | 0 | 0 |
| Batch B | 0 | 0 | 0 | 0 | 5.5 | 0 |
| HQMME | 0 | .1 | 0 | .1 | 0 | .1 |
| ZnDADTC | 0 | .1 | 0 | .1 | 0 | .1 |
| TAIC | 0 | 0 | 0 | .3 | 0 | 0 |
| Dicumyl Peroxide | 2.0 | 2.0 | 2.0 | 2.0 | 2.0 | 2.3 |
| Monsanto ODR at 360° F., ±3° F. | | | | | | |
| $M_H$ (in.lb.) | 68.1 | 60.0 | 60.8 | 69.2 | 68.6 | 66.0 |
| $T_{C90}$ min. | 5.1 | 5.3 | 5.3 | 4.9 | 4.9 | 5.2 |
| Monsanto ODR at 290° F. | | | | | | |
| $T_{S2}$ min. | 3.6 | 10.0 | 9.7 | 9.5 | 9.2 | 8.9 |

The masterbatch procedure has more chances for weight loss and is the only reason for the slight difference in results between (D) and (E). TAIC is well known for increasing the state of the cure while having little effect on cure and scorch times. On a weight basis, its use is slightly better than additional dicumyl peroxide in this formulation, (F) and (G) vs. (H) as it restores the $M_H$ with only a small amount compared to normal use levels and has little effect on $T_{S2}$. Masterbatch (B), thus, allows variation of scorch retarder level without changing peroxide level or affecting $M_H$. When using the masterbatch approach, there are also no solubility or long term homogeneity concerns for the peroxide used.

EXAMPLE 7

These examples show that the composition may be added dispersed on a filler for use in the rubber industry where powders or solids are preferred. Di-t-amyl hydroquinone (DTAHQ) and a sulfur accelerator blend from U.S. Pat. No. 4,632,950 shows a synergistic effect in scorch times when combined along with advantages in cure in Nordel 1040 EPDM cured with 1,1-bis(t-butylperoxy)-3,3,5-trimethyl cyclohexane, 40% on a filler.

| Composition | A | B | C | B&C | D | E |
|---|---|---|---|---|---|---|
| | (Quantities in parts by weight) | | | | | |
| Nordel 1040 | 100 | 100 | 100 | — | 100 | 100 |
| N550 black | 60 | 60 | 60 | — | 60 | 60 |
| Sunpar 2280 oil | 10 | 10 | 10 | — | 10 | 10 |
| 1,1-bis-(t-butylperoxy)-3,3,5-trimethylcyclohexane (40%) | 6.0 | 6.0 | 6.0 | — | 6.0 | 6.0 |
| di-t-amyl hydroquinone | 0 | .45 | 0 | — | .45 | .516 |
| Zinc dimethyldithio carbamate | 0 | 0 | .06 | — | .06 | 0 |
| Copper dimethyldithiocarbamate | 0 | 0 | .006 | — | .006 | 0 |
| Monsanto ODR at 300° F. at ±3° arc | | | | | | |
| $M_H$ (in.lbs.) | 48 | 51 | 44 | — | 50 | 51 |
| $T_{C90}$ (min.) | 7.4 | 7.5 | 7.1 | — | 6.6 | 8.2 |
| $T_v$ (min.) | 6.1 | 6.0 | 5.7 | — | 4.9 | 6.5 |
| Monsanto ODR at 250° F. | | | | | | |
| $T_{S2}$ (min.) | 6.6 | 9.1 | 7.1 | — | 11.6 | 9.9 |
| $\Delta M_H$ | — | +3 | -4 | -1 | +2 | +3 |
| $\Delta T_{C90}$ | — | +.1 | -.3 | -.2 | -.8 | +.8 |
| $\Delta T_v$ | — | -.1 | -.4 | -.5 | -1.2 | +.4 |
| $\Delta T_{S2}$ | — | +2.5 | +.5 | +3.0 | +5.0 | +3.3 |

B and C are prior art scorch inhibitor systems which if combined additively as in column (B & C) would increase $T_{S2}$ at 250° by 3.0 min. with slight changes to the state and rate of cure. The sulfur accelerators lower the state of cure and di-t-amyl hydroquinone at low levels acts as a coagent in this polymer and peroxide as a benzoquinone derivative works in EPM. The actual composition (D) increases $T_{S2}$ over (A) by 5.0 min. at higher $M_H$ at a 20% faster vulcanization time. Simply adding more DTAHQ causes a slightly longer $T_{S2}$ but $T_v$, i.e., vulcanization time, in (E) is one-third longer than (D).

EXAMPLE 8

This example also illustrates the advantage of a hydroquinone and sulfur accelerator blend when added with a filler extended peroxide for an elastomer cure. 2,5-dimethyl-2,5-di(t-butylperoxy)hexane 45% on a $CaCO_3$ and silica filler, when blended with a small amount of di-t-amyl hydroquinone and tetramethylthiuram monosulfide results in better scorch time and cure time than these compounds used alone at equal weight in curing a fluoroelastomer.

| Composition | A | B | C | D |
|---|---|---|---|---|
| | (Quantities in parts by weight) | | | |
| FC2480* | 100 | 100 | 100 | 100 |
| N774 black | 20 | 20 | 20 | 20 |
| $Ca(OH)_2$ | 3.0 | 3.0 | 3.0 | 3.0 |
| TAIC | 2.5 | 2.5 | 2.5 | 2.5 |
| 2,5-dimethyl-2,5-di(t-butylperoxy)-hexane (45%) | 2.5 | 2.5 | 2.5 | 2.5 |
| di-t-amyl hydroquinone | 0 | .05 | .10 | .05 |
| tetramethylthiuram monosulfide | 0 | 0 | 0 | .05 |
| Monsanto ODR at 350° F. ±3° arc | | | | |
| $M_H$ (in-lb.) | 96 | 99 | 99 | 98 |
| $T_{C90}$ (min.) | 7.6 | 8.4 | 9.4 | 7.7 |
| Monsanto ODR at 300° F. | | | | |
| $T_{S2}$ (min.) | 4.9 | 7.0 | 8.7 | 10.8 |

*FC2480 = flouroelastomer from 3M

The first two additions of 0.05 parts of the hydroquinone increase scorch time by only 2 minutes each and cure time by one minute each. Sulfur accelerators or accelerator blends will increase $T_{S2}$ at 300° by only 0.8 to 1.6 minutes at this level without changing the cure time. Higher sulfur levels would not be preferred because of odor and a negative effect on aging. In sample D, adding tetramethyl thiuram monosulfide instead of additional di-t-amyl hydroquinone, scorch time is improved by 5.9 minutes over the control A, instead of the 3.8 minutes improvement in C, while the cure time ($T_{C90}$) is reduced back to the desirable original value. This balance is not possible with either compound used individually.

Changing to a higher temperature half life peroxide such as 2,5-dimethyl-2,5-di(t-butylperoxy)hexyne-3 to increase scorch safety (as well as cure time) results in a $T_{S2}$ at 300° F. of 9.8 min., or an improvement of 4.9 minutes at a lower state of cure.

EXAMPLE 9

This example shows storage stability of scorch retarded peroxide solutions. Various formulations and a control were aged three times at three different temperatures slightly over normal storage temperatures and assayed for percent peroxide.

| Components | A | B | C | D |
|---|---|---|---|---|
| | (parts by weight) | | | |
| dicumyl peroxide | 100 | 96.0 | 96.0 | 88.0 |
| mono-t-butyl hydroquinone | 0 | 2.0 | 2.0 | 0 |
| hydroquinone monomethyl ether | 0 | 0 | 0 | 6.0 |
| Zn diamyl dithiocarbamate (50%) | 0 | 2.0 | 0 | 6.0 |
| tetrabutyl thiuram disulfide | 0 | 0 | 2.0 | 0 |

-continued

| | | Peroxide assay after aging conditions (%) (time in weeks) | | | | | | | | |
|---|---|---|---|---|---|---|---|---|---|---|
| | | | | | Temperature | | | | | |
| | | 30° C. | | | 40° C. | | | 50° C. | | |
| Peroxide formulation | Start | 2 | 4 | 8 | 2 | 4 | 8 | 2 | 4 | 8 |
| A | 92.0 | 90.9 | 92.2 | 92.0 | 89.3 | 92.2 | 91.8 | 92.0 | 91.7 | 92.7 |
| B | 88.6 | 89.8 | 90.0 | 87.4 | 88.0 | 88.3 | 87.2 | 87.3 | 87.7 | 86.5 |
| C | 87.3 | 86.7 | 85.9 | 86.7 | 85.7 | 86.3 | 86.2 | 86.3 | 87.6 | 87.2 |
| D | 87.8* | 86.5 | 87.6 | 89.3 | 86.3 | 87.2 | 89.3 | 86.4 | 87.1 | 88.7 |

Peroxide assays (±2%) show no pattern of degradation, therefore they are stable at normal storage temperatures.
*Sample D was made with a higher assay dicumyl peroxide so the final unaged assay was similar to B and C.

EXAMPLE 10

Solubility of some additives varies in different classes of peroxides and also over time. This can be improved by adding a liquid or solid co-curing agent. The normal application of such co-curing agent (coagent) in improving the state of cure is useful here, but such agents appear to unexpectedly improve solubility and more importantly stability of additives, sometimes lowering melting point, and to increase ease of preparation of the peroxide solution without adding inert extenders. The table in this example shows two peroxide solutions with a small portion of the peroxide replaced with a coagent and a comparison of visual changes over time.

| | Formulation (parts by weight) | | | |
|---|---|---|---|---|
| Ingredient | A | B | C | D |
| dicumyl peroxide | 50 | 50 | 0 | 0 |
| n-butyl-4,4-bis(t-butyl-peroxy)valerate | 50 | 25 | 0 | 0 |
| 2,5-dimethyl-2,5-di(t-butylperoxy)hexyne-3 | 0 | 0 | 100 | 85 |
| hydroquinone monomethyl ether | 4.0 | 4.0 | 5.0 | 5.0 |
| Zn diamyl dithiocarbamate (50%) | 2.0 | 2.0 | 0 | 0 |
| tetramethyl thiuram mono-sulfide | 0 | 0 | 0.5 | 0.5 |
| triallyl trimellitate | 0 | 25 | 0 | 0 |
| triallyl cyanurate | 0 | 0 | 0 | 15 |
| Age-Time | (2 months) | | (1 month) | |
| Color | brown | none | slight | slight |
| Insolubles | yes | none | slight | none |

Solutions A and B were originally clear and C and D were clear and slightly yellow but A and C showed a change in solubility of additives. The coagents suprisingly facilitated the rate and amount of solubility of the scorch retarders with an active ingredient and more importantly unexpectedly stabilized mixtures such as B and D.

EXAMPLE 11

This example shows the activity of solutions from the last example in a crosslinking reaction. The solutions were compared to a single peroxide control in crosslinking the same. polymer before and after aging. Mixing and curing conditions in the Monsanto Rheometer were held constant at all times.

| | Formulation (parts by weight) | | | |
|---|---|---|---|---|
| Ingredient | A | B | C | D |
| dicumyl peroxide | 53 | 100 | 0 | 0 |
| n-butyl-4,4-bis(t-butyl-peroxy)valerate | 25 | 0 | 0 | 0 |
| 2,5-dimethyl-2,5-di(t-butylperoxy)hexyne-3 | 0 | 0 | 85 | 100 |
| hydroquinone monomethyl ether | 0 | 0 | 5.0 | 0 |
| di-t-amyl hydroquinone | 2.0 | 0 | 0 | 0 |
| Zn diamyl dithiocarbamate (50%) | 1.0 | 0 | 0 | 0 |
| tetramethyl thiuram mono-sulfide | 0 | 0 | 0.5 | 0 |
| triallyl cyanurate | 22 | 0 | 15 | 0 |
| Original cure properties crosslinking EVA (±3° arc) | | | | |
| Solution in EVA (p hr) | 1.50 | 1.50 | 2.11 | 2.00 |
| Rheometer temperature | 360° F. | | 380° F. | |
| $M_H$ in. lb. | 51.1 | 51.2 | 71.6 | 71.8 |
| $T_{C90}$ min. | 4.7 | 5.3 | 7.7 | 8.1 |
| Rheometer temperature | 290° F. | | 320° F. | |
| $T_{S2}$ min. | 8.4 | 7.3 | 9.9 | 2.7 |
| A and C aged 1 month at 32° C., cure properties in same EVA | | | | |
| Rheometer temperature | 360° F. | | 380° F. | |
| $M_H$ in. lb. | 51.4 | 51.4 | 72.7 | 71.8 |
| $T_{C90}$ min. | 4.5 | 5.2 | 7.9 | 7.7 |
| Rheometer temperature | 290° F. | | 320° F. | |
| $T_{S2}$ min. | 8.5 | 7.3 | 10.2 | 2.8 |

There is no change in crosslinking efficiency as measured by $M_H$ and no loss of scorch retardation which is measured by $T_{S2}$ after ageing one month at an average temperature of 32° C. The solutions retain solubility and efficiency with the TAC coagent without dilution with inert ingredients. Unexpectedly we found that the order of addition of the various additives and peroxide can greatly affect the speed and ease of preparing a homogenous solution. A formulation such as C, in this example, is prepared more quickly by adding peroxide last. HQMME (melting point of 54° C.) and TMTM (105° C.) are very soluble in TAC (27° C.) resulting in a mixture which melts at about 15° C. and then blends quickly with TMDBPH-3. Mixing in the order of formulation (C) as listed could take up to ten times longer. Samples A and B have equal crosslinking efficiency at equal weight. Slightly more of solution C is used to equal D although extra peroxide or co-agent alone could be used as relative efficiency varies with the polymer used. Varying the level of C has the least effect on scorch time.

EXAMPLE 12

CROSSLINKING HIGH DENSITY POLYETHYLENE (HDPE)

Resin: High density polyethylene having melt flow index (MFI) 38 g/10 min. at 190° C. and Sp. Gr. 0.941–0.98 g/cc This Example illustrates the improvement in scorch time with minimal effect on cure time obtainable when crosslinking HDPE with a typical scorch retarding crosslinking composition of the invention.

| | Peroxide Solutions: (Quantities in parts by weight) | | | | |
|---|---|---|---|---|---|
| Ingredients | A | B | C | D | E |
| 2,5-dimethyl-2,5-di(t-butylperoxy)hexyne-3 | 0.75 | 0.75 | 0.75 | 0.75 | 0.75 |
| Triallylcyanurate | 0.15 | 0.15 | 0.15 | 0.15 | 0.15 |
| Hydroquinone Monomethyl ether | — | 0.08 | — | 0.08 | 0.08 |
| Tetramethyl Thiuram Monosulfide | — | — | 0.01 | 0.01 | 0.02 |

| Solutions Mixed Into HDPE Resin Batch | | | | | |
|---|---|---|---|---|---|
| | (Quantities by weight) | | | | |
| | F | G | H | I | J |
| Resin | 100 | 100 | 100 | 100 | 100 |
| Solution A | 0.5 | — | — | — | — |
| Solution B | — | 0.8 | — | — | — |
| Solution C | — | — | 0.5 | — | — |
| Solution D | — | — | — | 0.8 | — |
| Solution E | — | — | — | — | 0.8 |
| Monsanto ODR R-100 Cures at ±3° arc. | | | | | |
| $M_H$ (in-lbs) at 400° F. | 30.4 | 29.8 | 30.4 | 32.2 | 33.2 |
| $T_{C90}$ (min.) at 400° F. | 6.8 | 7.0 | 6.1 | 7.0 | 7.0 |
| $T_{S2}$ (min.) at 350° F. | 9.1 | 10.5 | 8.5 | 12.1 | 12.4 |
| $\Delta T_{S2}$ (min.) at 350° F. | — | +1.4 | −0.6 | +3.0 | +3.3 |

A solution of 2,5-dimethyl 2,5-di(t-butyl peroxy) hexyne-3 with triallylcyanurate (TAC) and hydroquinone monomethyl ether (HQMME) represented by formulation "G" provides a slight improvement in scorch time as compared to the control (formulation "F"). Using a small amount of tetramethylthiuram monosulfide, formulation "H", actually results in an adverse effect on scorch time (a decrease in $T_{S2}$ versus the control). Quite unexpectedly, a blend of these additives "I" results in a significant improvement in scorch time which cannot be attained by the additive effect of the materials used separately. Using more quinone to enhance scorch protection will continue to adversely reduce the final cure ($M_H$). The unique composition of this invention "I" also provides an unexpected increased level of HDPE crosslinking as compared to "G" and even the control "F". To further support this unexpected synergism, increasing the amount of thiuram in formulation "J" shows continued improvement in crosslinking and scorch time protection.

EXAMPLE 13

This example describes the synergistic increase in scorch time protection that can be obtained when a sulfur accelerator of the thiazole sulfenamide class is used in combination with a hydroquinone type compound. Thus an EVA containing two antioxidants is crosslinked with a scorch retarding crosslinking composition consisting of a homogeneous solution of dicumyl peroxide, N-cyclohexyl-2-benzothiazole sulfenamide and hydroquinone monomethyl ether.

The two antioxidants used were supplied by R. T. Vanderbilt and are listed below.

Agerite MA: polymerized trimethyl dihydroquinoline

Vanox ZMTI: Zn 2-mercaptotoluimidazole

In the compositions listed below, the level of peroxide (dicumyl peroxide) was adjusted in order to provide equivalent state of cure as measured by the Monsanto ODR.

| FINAL POLYMER COMPOSITION: | A | B | C | D |
|---|---|---|---|---|
| EVA UE637 (USI) | 100 | 100 | 100 | 100 |
| Agerite MA | 0.5 | 0.5 | 0.5 | 0.5 |
| Vanox ZMTI | 0.5 | 0.5 | 0.5 | 0.5 |
| dicumyl peroxide | 2.00 | 2.14 | 2.12 | 2.12 |
| N-cyclohexyl-2-benzothiazole sulfenamide | 0 | 0.04 | 0 | 0.04 |
| hydroquinone monomethyl ether | 0 | 0 | 0.06 | 0.06 |
| MONSANTO ODR CURE AT 360°, 3°arc | | | | |
| $M^H$ (in-lbs) | 34 | 34 | 34 | 33 |
| TC90 (min) | 6.4 | 6.2 | 6.3 | 6.4 |
| MONSANTO ODR SCORCH EVALUATION AT 290° F., 3°arc | | | | |
| $TS_2$ (min) | 7.9 | 10.1 | 13.2 | 16.0 |
| DELTA $T_{S2}$ (min) | — | 2.2 | 5.3 | 8.1 |

Using the scorch retarder additives N-cyclohexyl-2-benzothiazole sulfenamide, in system "B" and the hydroquinone monomethyl ether, in system "C" separately provided a corresponding improvement in scorch protection of 2.2 and 5.3 respectively, versus the control "A". Using both of these in combination, one would expect an improvement of about 2.2+5.3=7.5 minutes. However as contemplated by this invention, the synergistic combination of these additives in system "D" provides a significantly higher improved scorch protection of 8.1 minutes, with no significant loss in the degree of crosslinking or cure rate performance.

ADDITIONAL FREE RADICAL INITIATORS

An addition preferred class of dialkyl peroxides included among the free radical initiators contemplated by the invention are those having the Formula:

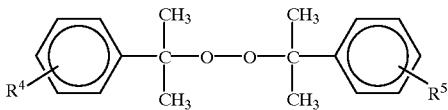

wherein $R^4$ and $R^5$ may independently be in the meta or para positions and may be the same or different and are selected from hydrogen, or straight or branched chain lower alkyl of from 1 to about six carbon atoms.

We claim:

1. An improved process for compounding a polymer selected from the group consisting of thermoplastic polymers curable with organic peroxides, elastomeric polymers curable with organic peroxides and mixtures of such thermoplastic polymers and elastomeric polymers which improved process provides improved scorch resistance during said compounding with substantially no adverse effect on crosslinking, said improved process comprising compounding said thermoplastic polymers, elastomeric polymers or mixtures thereof with from 0.01 to 30 parts by weight based on polymer of organic peroxide in the presence of a weight ratio to organic peroxide, of 0.5:100 to 1:2 of a scorch retarding composition formed by mixing as the essential ingredients hydroquinone, at least one sulfur accelerator selected from the group consisting of dithiocarbamates, thiurams, thiazoles and sulfenamides in a weight ratio to hydroquinone of 1:500 to 50:1 and coagent selected from the group consisting of monofunctional vinyl monomers, monofunctional allyl monomers, polyfunctional vinyl monomers, polyfunctional allyl monomers and mixtures thereof in a weight ratio of 100:1 to 1:100 based on the total weight of hydroquinone and sulfur accelerator.

2. A process as defined in claim 1 wherein the scorch retarding composition is a preformed mixture.

3. A process as defined in claim 1 wherein the scorch retarding composition is formed by adding hydroquinone, sulfur accelerator and coagent individually during compounding.

4. A process as defined in claim 2 wherein the preformed mixture of the scorch retarding composition is formed by mixing the three ingredients thereof substantially contemporaneously.

5. A process as defined in claim 2 wherein the preformed mixture of the scorch retarding composition is formed by mixing any two of the ingredients thereof to form a submixture and subsequently adding the third ingredient to said submixture to form said preformed mixture.

6. A process as defined in claim 1 wherein the sulfur accelerator is selected from compounds represented by the structure:

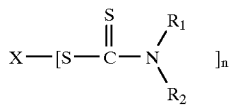

wherein X is an ion derived from a metal selected from the group consisting of nickel, cobalt, iron, chromium, tin, zinc, copper, lead, bismuth, cadmium, selenium and tellurium, n may vary from 1 to 6 and is equal to the formal valence of the metal ion, $R_1$ and $R_2$ are independently alkyl of 1 to 7 carbon atoms.

7. A process as defined in claim 1 wherein the sulfur accelerator is selected from the group consisting of: bismuth dimethyldithiocarbamate, cadmium diamlydithiocarbamate, cadmium diethyldithiocarbamate, copper dimethyldithiocarbamate, lead diamyldithiocarbamate, lead dimethyldithiocarbamate, selenium dimethyldithiocarbamate, tellurium diethyldithiocarbamate, zinc diamyldithiocarbamate, zinc dibutyldithiocarbamate, zinc diethyldithiocarbamate, and selenium dimethyldithiocarbamate.

8. A process as defined in claim 1 wherein the sulfur accelerator is selected from compounds represented by the formula:

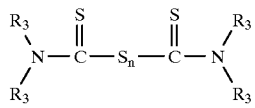

wherein $R_3$ is an alkyl group of 1 to 7 carbon atoms and n may have a positive value from greater than zero up to about 6.

9. A process as defined in claim 1 wherein the sulfur accelerator is selected from the group consisting of tetrabutylthiuram disulfide, tetramethylthiuram disulfide and tetramethylthiuram monosulfide or mixtures thereof.

10. A process as defined in claim 1 wherein the hydroquinone is selected from the group consisting of hydroquinone, hydroquinone di(betahydroxyethyl) ether, hydroquinone monomethyl ether, mono-t-butyl-hydroquinone, di-t-amylhydroquinone or mixtures thereof.

11. A process as defined in claim 1 wherein the coagent is selected from the group consisting of allyldiglycol carbonate, triallylcyanurate, triallylisocyanurate, allylmethacrylate, trimethylolpropane trimethacrylate, diallyladipate, diallyloxalate, diallylfumerate, triallylphosphate, tetraallyloxyethane, triallyltrimellitate and liquid 1,2-polybutadiene, and mixtures thereof.

12. A process as defined in claim 1 wherein the organic peroxide is selected from the group consisting of dialkyl peroxides, diperoxyketals and mixtures thereof.

13. A process as defined in claim 1 wherein the dialkyl peroxides are selected from dicumylperoxide; alpha, alpha-bis (t-butyl peroxy) diisopropylbenzene; t-butyl cumyl peroxide; t-butyl isopropylcumyl peroxide; 2,5-dimethyl-2,5-di(t-butylperoxy)-hexane; 2,5-dimethyl-2,5-di(t-amylperoxy)-hexane; 2,5-dimethyl-2,5-di(t-butylperoxy)-hexyne-3; 2,5-dimethyl-2,5-di-amylperoxy)-hexyne-3; di-t-amylperoxide; 1,3,5-tri[(t-butylperoxy)-isopropyl]-benzene; 1,3-dimethyl-3-(t-butylperoxy)butanol; m/p-isopropylcumyl cumyl peroxide; and mixtures thereof.

14. A process as defined in claim 1 wherein the diperoxyketal initiators are selected from the group consisting of: 1,1-di(t-butylperoxy)-3,3,5-trimethylcyclohexane; 1,1-di(t-butylperoxy) cyclohexane; n-butyl-4,4-di(t-amylperoxy) valerate; ethyl-3,3-di(t-butylperoxy)-butyrate; 2,2-di(t-amylperoxy)-propane; 3,6,6,9,9-pentamethyl-3-ethoxy carbonyl-methyl-1,2,4,5-tetraoxacyclononane; n-butyl-4,4-bis (t-butylperoxy)-valerate; ethyl -3,3-di(t-amylperoxy)-butyrate and mixtures thereof.

15. A process as defined in claim 1 wherein the hydroquinone is hydroquinone monomethyl ether, the sulfur accelerator is zinc diamyldithiocarbmate, and the free radical initiator is dicumyl peroxide.

16. A process as defined in claim 1 wherein the hydroquinone is hydroquinone monomethyl ether, the sulfur accelerator is zinc diamyldithiocarbamate, the free radical initiator is dicumyl peroxide and the thermoplastic polymer is linear low density polyethylene.

17. A process as defined in claim 1 wherein the hydroquinone is mono-t-butylhydroquinone, and the sulfur accelerator is tetrabutylthiuram disulfide.

18. A process as defined in claim 1 wherein the hydroquinone is mono-t-butylhydroquinone, the sulfur accelerator is tetrabutylthiuram disulfide and the free radical initiator is dicumyl peroxide.

19. A process as defined in claim 1 wherein the hydroquinone is mono-t-butylhydroquinone, the sulfur accelerator is tetrabutylthiuram disulfide, the free radical initiator is dicumyl peroxide and the thermoplastic polymer is ethylene-vinylacetate.

20. A process as defined in claim 1 wherein the hydroquinone is mono-t-butylhydroquinone, the sulfur accelerator is tetrabutylthiuram disulfide and the free radical initiator is 2,5-dimethyl-2,5-di(t-butylperoxy) hexane.

21. A process as defined in claim 1 wherein the hydroquinone is mono-t-butylhydroquinone, the sulfur accelerator is tetrabutylthiuram disulfide, and the elastomeric polymer is ethylene-vinylacetate.

22. A process as defined in claim 1 wherein the hydroquinone is hydroquinone monomethyl ether, the sulfur accelerator is zinc diamyldithiocarbamate, the free radical initiator is 1,1-bis(t-butylperoxy)-3,3,5-trimethyl-cyclohexane.

23. A process as defined in claim 1 wherein the hydroquinone is hydroquinone monomethylether, the sulfur accelerator is zinc diamyl-dithiocarbmate, the free radical initiator is 1,1-bis-(t-butylperoxy)-3,3,5-trimethyl-cyclohexane and the thermoplastic polymer is an ethylene-propylene-diene monomers terpolymer.

24. A process defined in claim 1 wherein the hydroquinone is hydroquinone monomethyl ether, the sulfur accelerator is zinc dibutyldithiocarbamate and the free radical initiator is a mixture of dicumyl peroxide and 1,1-di[(t-butylperoxy)isopropyl]-benzene.

25. A process as defined in claim 1 wherein the hydroquinone is hydroquinone monomethyl ether, the sulfur accelerator is zinc diamyldithiocarbamate, the free radical initiator is dicumyl peroxide and the thermoplastic polymer is linear low density polyethylene.

26. A process as defined in claim 1 wherein the hydroquinone is hydroquinone monomethyl ether, the sulfur accelerator is zinc diamyldithiocarbamate, the free radical initiator is 1,1-bis-(t-butylperoxy)-3,3,5-trimethyl-cyclohexane.

27. A process as defined in claim 1 wherein the hydroquinone is hydroquinone monomethylether, the sulfur accelerator is zinc diamyl-dithiocarbamate, the free radical initiator is 1,1-bis-(t-butylperoxy)-3-3-5-trimethyl-cyclohexane and the elastomeric polymer is an ethylene-propylene-diene monomers terpolymer.

28. A process as defined in claim 1 wherein the coagent is triallycyanurate.

29. A process as defined in claim 1 wherein the coagent is triallyltrimellitate.

30. A process as defined in claim 1 wherein the polymer is high density polyethylene.

31. A process as defined in claim 1 wherein the sulfur accelerator is N-cyclohexyl-2-benzothiazole sulfenamide.

32. A process as defined in claim 1 wherein the hydroquinone is mono-t-butyl hydroquinone and the sulfur accelerator is zinc dibutyldithiocarbamate.

33. A process as defined in claim 1 wherein the hydroquinone is mono-t-butyl hydroquinone or hydroquinone monomethyl ether or a mixture of these hydroquinones.

* * * * *